United States Patent Office 3,427,247
Patented Feb. 11, 1969

3,427,247
ELECTROVISCOUS COMPOSITIONS
Robert L. Peck, Woodbridge, Conn., assignor to Textron, Inc., a corporation of Delaware
No Drawing. Continuation-in-part of application Ser. No. 133,874, Aug. 25, 1961. This application Aug. 2, 1965, Ser. No. 476,728
U.S. Cl. 252—75                7 Claims
Int. Cl. C09k 3/00; F16d 27/00

This application is a continuation-in-part of my application Ser. No. 133,874, filed Aug. 25, 1961, now abandoned.

This invention relates to electroviscous compositions and methods of making the same.

An object of the present invention is to provide a new class of electroviscous compositions which exhibit extremely large changes in effective viscosity with changes in an applied electric field. Compositions according to the invention have been found to exhibit changes in effective viscosity of the order of ten or more times that displayed by any heretofore known compositions under the same operating conditions. As used herein, the effective viscosity is defined as being equal to the viscosity of an unenergized fluid at the same shear rate producing the same shear forces.

Electroviscous compositions as described herein can be used in any of the various devices described and claimed in application Ser. No. 479,038, filed contemporaneously herewith as a division of the above-identified application No. 133,874. Obviously, the compositions can also be used anywhere that electroviscous compositions are useful such as in the fluid couplings described in Patent No. 2,886,151.

It is also an object of the present invention to provide electroviscous compositions which are more stable and less abrasive than compositions heretofore known.

Various theories have been advanced for explaining the mechanism by which electroviscous compositions change their effective viscosity in the presence of an electric field. However, too much is still unknown about this phenomenon to enable a definite theory to be propounded. Nevertheless, the belief that a possible dependence exists between electroviscosity and the hydrogen bond has led to the discovery of virtually an infinite variety of compositions which exhibit the electroviscous effect, i.e., a change in effective viscosity in the presence of an applied electric field. It will be understood that the hydrogen bond or hydrogen bonding refers to the bond established between hydrogen and another element by reason of a low-energy attractive force existing therebetween. It is not a chemical union. The hydrogen atom has but a single electron; hence it can often closely approach valence electrons of another molecule and thus form a bond.

It has been discovered in accordance with the present invention that an improved electroviscous composition can be produced by dispersing in a dielectric liquid vehicle a quantity of a finely divided non-conductive solid whose particles have adsorbed thereon both a hydrogen bonding acid and a hydrogen bonding base. It is believed that the change in effective viscosity upon the application of an electric field is due to some proton transfer mechanism, not yet fully understood, involving the hydrogen bonding acids and hydrogen bonding bases which results in an increase in the zeta potential. The zeta potential is that potential existing between the charges on the surface of a suspended particle and the charges surrounding the particle in the suspending medium. There may also arise internal $I^2R$ losses which, combined with the zeta potential change, affect the effective viscosity.

However, whatever the explanation, both hydrogen bonding acids and hydrogen bonding bases must be present in the composition for it to exhibit large changes in effective viscosity with change in the applied electric field.

Certain carboxylic compounds are known to be hydrogen bonding acids. All of those hydrogen bonding acids containing a carboxyl group which have been tried have yielded satisfactory results. Among those are formic acid, acetic acid, lactic acid, malic acid, malonic acid, octanoic acid, oxalic acid, pyruvic acid and trichloroacetic acid.

Among those hydrogen bonding bases which have been found to be useful in the practice of the present invention are the alcohols such as methanol, ethyl alcohol, glycerol, ethylene glycol, diethylene glycol, sorbitol and guaiacol; the amides such as acetamide and formamide; the amines such as aniline, ethylenediamine, triethanolamine, hydroxyethylcyclohexylamine, cyanoethylcyclohexylamine, and phenylcyclohexylamine; ketones such as benzophenone; phenols such as phenol and resorcinol; the pyridines as, for example, pyridine; and ammonium hydroxide.

A number of dielectric liquid vehicles have been tried successfully. They are: xylene having an initial viscosity of approximately 0.8 cps.; carbon tetrachloride; "Freon" E-3, a liquid fluorocarbon produced by E. I. du Pont de Nemours & Co., Inc., having a specific gravity of 1.723, a boiling point of 306° F., a dielectric constant of 2.58 and the general formula

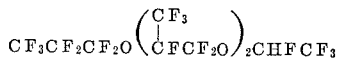

a silicone oil produced by Dow Corning Corp. and known as Dow Corning Fluid 200–.65, having a viscosity of 0.49 cps.; and mineral oil. Also usable are natural oils including castor oil, cotton seed oil, linseed oil and olive oil; and kerosene.

The nature and selection of the non-conductive solid will appear below with discussions of a number of specific examples.

In initial tests various quantities of formic acid were added to 1 gram of $SiO_2$, which was then added to 24 cc. of xylene. The resultant composition was placed between electrodes having an area of 12.5 square centimeters spaced at 0.013 centimeter. The torque and current was noted as a function of applied voltage between the electrodes. It was observed that the troque in gram centimeters varied from about 3 at 400 volts with a composition containing 1 drop of formic acid to about 30 at 800 volts. Increasing the formic acid to 3 drops caused an increase in the current.

Again with a composition containing 1 drop of formic acid, 12 drops of aniline were added to the xylene. This caused the torque at 400 volts to jump to about 12 and at 800 volts it was about 56. This same composition at 200 volts provided a torque of about 2.5 gm.-cm. Below 200 volts the torque approached zero such that the overall change in torque from the deenergized condition to that at 800 volts was well over 100 to 1.

The relationship between the current and voltage was also ascertained for compositions containing 3 drops of formic acid and 4 drops of aniline. The current rose rapidly from about 1.25 ma. at 200 volts to about 15 ma. at 600 volts.

Early work was with compositions employing solid particles such as NaHCO₃, SiO₂, and TiO₂, all of which had a mean diameter generally greater than 0.1 micron. Initial attempts to utilize smaller particles were generally unsuccessful until a novel procedure was discovered which permitted the production of compositions utilizing pyrogenic silica sold by the Oxides Division of Cabot Corporation under its trademark "Cab-o-sil." The M–5 grade was selected. This is a material having an extremely small particle size with an enormous external surface area. It is produced by the hydrolysis of silicon tetrachloride at 1100° C. The foregoing is accomplished by a vapor phase process. According to the manufacturer, this grade of pyrogenic silica has an average particle size or diameter of 0.012 micron.

The new procedure can best be described with reference to the preparation of a specific sample. The example chosen yields one of the presently preferred compositions.

A quantity of the pyrogenic silica is first dehydrated by baking in an oven at a temperature of 400° F., or higher, for a period of at least one hour. The powder is then transferred into a glass container having a metallic electrode covering its outer surface. A separate metallic probe is then connected along with the external electrode to a source of 20,000 volts or greater, the probe being connected to the negative terminal of the source. The powder is then charged by moving the probe through it.

Next, a 50 cc. quantity of the charged powder (this is loose bulk volume) is added to a glass mixing jar to which is added a number of ceramic mixing balls previously heated to 300° F. or higher. Conveniently, they may be placed in the oven with the silica while the latter is being dehydrated. With the mixing balls on one side of the jar, 3 drops or 0.18 cc. of formic acid is added to the other side of the jar. The jar is sealed and then shaken. The heated mixing balls serve to vaporize the formic acid as well as to mechanically agitate and stir the powder for uniform coating of the particles.

After the formic acid is adsorbed by the particles, 6 drops or 0.36 cc. of aniline is similarly added and adsorbed on the particle surface by further mixing. After coating, the balls are separated from the powder and the powder is added to 50 cc. of xylene and directly mixed.

While volume was utilized in the measurement of ingredients during the compounding of experimental compositions, it may be more convenient to relate the various quantities on a weight basis. Hence, these figures have been computed for the various examples and are included below. In all of the following examples the data in column A represents the actual measurements employed. Measurement of the solid particles is always by loose bulk. In column B there is set forth the weight equivalents of the volumes found in column A. Column C contains the percentages of the particular ingredients related to the total weight of the composition. Column D gives the weight percentages of the hydrogen bonding acid and hydrogen bonding base related to the weight of the solid material.

Finally, column E sets forth on a part basis by weight the number of parts of the liquid vehicle relative to one part of the solid material. Thus, the data on the example described above is:

EXAMPLE I

|  | A | B (grams) | C (percent) | D (percent) | E (parts) |
| --- | --- | --- | --- | --- | --- |
| Pyrogenic silica | 50 cc | 2.25 | 4.9 |  | 1 |
| Formic acid | 3 drops | 0.22 | .48 | 9.8 |  |
| Aniline | 6 drops | 0.36 | .78 | 16.0 |  |
| Xylene | 50 cc | 43 | 93.84 |  | 19.1 |

The formic acid employed above and in the additional examples to be described was as concentrated as could readily be obtained commercially. As such, it contained less than 12% water by volume. Unless otherwise indicated, it can be assumed that all materials referred to herein were of commercial grade or technical grade.

A viscosimeter was constructed with the relatively rotatable members insulated from one another so that a controlled variable voltage could be applied therebetween and across the gap. Samples made as above, as well as those described below, were tested in this viscosimeter so as to obtain an indication as to the comparative magnitude of the change in effective viscosity with change in applied voltage. A sample produced as described above with the stated proportions of pyrogenic silica, formic acid, aniline and xylene was tested by an independent organization. The results of these tests are set forth in Table I below along with corresponding data relating to the best two commercially available prior art fluids on which data is presently available.

TABLE I
Shear rate: 1,000 sec.$^{-1}$
Field strength: 100 volts per mil

| Fluid | Viscosity (cps.) | | Ratio of Energized to Deenergized |
| --- | --- | --- | --- |
|  | Deenergized | Energized |  |
| Prior Art A | 10 | 275 | 27.5 |
| Prior Art B | 8.7 | 150 | 17.24 |
| Invention, Example I | 1.46 | 1,600 | 1,096 |

Shear rate: 2,000 sec.$^{-1}$
Field strength: 100 volts per mil

| Fluid | Viscosity (cps.) | | Ratio of Energized to Deenergized |
| --- | --- | --- | --- |
|  | Deenergized | Energized |  |
| Prior Art A | 10 | 125 | 12.5 |
| Prior Art B | 8.7 | 62 | 7.13 |
| Invention, Example I | 1.46 | 625 | 428 |

The formulation set forth in Example I yields a fluid which, for the materials involved, appears to be near optimum where a large change in effective viscosity is desired with change in applied electric field. It can be shown that there is a correlation between the optimum relative quantities of the hydrogen bonding acid, hydrogen bonding base, and solid particles on the one hand and the total surface area of the particles and the number of available adsorption sites thereon on the other hand. An optimum composition appears to be one where the quantity of hydrogen bonding acid and hydrogen bonding base is selected so as to occupy all of the available sites on the particles.

Depending upon the materials involved, an increase in the hydrogen bonding base or hydrogen bonding acid beyond that which can be adsorbed on the particles will result in either contamination of the liquid vehicle or reaction therewith or inter-reaction between the excess acid and base. In general an excess of either the acid or base will increase the conductivity of the composition and reduce the change in effective viscosity.

The first few examples set forth below show the extent to which the various ingredients can be varied while still obtaining a fluid which exhibits a substantial change in effective viscosity with change in applied field. Typical examples are also given for other ingredients which have been found to be useful.

EXAMPLE II

| A | | B (grams) | C (percent) | D (percent) | E (parts) |
|---|---|---|---|---|---|
| Pyrogenic silica | 50 cc | 2.25 | 4.81 | | 1 |
| Formic acid | 6 drops | .44 | .96 | 19.6 | |
| Analine | 3 drops | .18 | .39 | 8.0 | |
| Xylene | 50 cc | 43 | 93.84 | | 19.1 |

EXAMPLE III

| | | | | | |
|---|---|---|---|---|---|
| Pygroenic silica | 50 cc | 2.25 | 4.80 | | 1 |
| Formic acid | 2 drops | .14 | .31 | 6.2 | |
| Aniline | 9 drops | .54 | 1.18 | 24 | |
| Xylene | 50 cc | 43 | 93.71 | | 19.1 |

EXAMPLE IV

| | | | | | |
|---|---|---|---|---|---|
| Pyrogenic silica | 50 cc | 2.25 | 4.89 | | 1 |
| Formic acid | 1 drop | .11 | .24 | 48 | |
| Aniline | 13 drops | .78 | 1.69 | 34.7 | |
| Xylene | 50 cc | 43 | 93.18 | | 19.1 |

EXAMPLE V

| | | | | | |
|---|---|---|---|---|---|
| Pyrogenic silica | 50 cc | 2.25 | 4.8 | | 1 |
| Formic acid | 1 drop | .11 | .23 | 4.8 | |
| Aniline | 21.3 drops | 1.40 | 3.0 | 62.3 | |
| Xylene | 50 cc | 43 | 91.97 | | 19.1 |

EXAMPLE VI

| | | | | | |
|---|---|---|---|---|---|
| Pyrogenic silica | 50 cc | 2.25 | 2.52 | | 1 |
| Formic acid | 3 drops | .22 | .247 | 9.8 | |
| Aniline | 6 drops | .36 | .402 | 16 | |
| "Freon" E-3 | 50 cc | 86.6 | 96.83 | | 38.4 |

EXAMPLE VII

| | | | | | |
|---|---|---|---|---|---|
| Pyrogenic silica | 50 cc | 2.25 | 2.73 | | 1 |
| Formic acid | 3 drops | .22 | .267 | 9.8 | |
| Aniline | 6 drops | .36 | .436 | 16 | |
| Carbon tetrachloride | 50 cc | 79.7 | 96.57 | | 35.4 |

EXAMPLE VIII

| | | | | | |
|---|---|---|---|---|---|
| Pyrogenic silica | 50 cc | 2.25 | 4.45 | | 1 |
| Formic acid | 3 drops | .22 | .435 | 9.8 | |
| Aniline | 6 drops | .36 | .712 | 16 | |
| Silicone oil | 50 cc | 47.7 | 94.40 | | 21.2 |

EXAMPLE IX

| | | | | | |
|---|---|---|---|---|---|
| Pyrogenic silica | 50 cc | 2.25 | 4.9 | | 1 |
| Formic acid | 2 drops | .14 | .31 | 6.2 | |
| Triethanolamine | do | .14 | .31 | 6.2 | |
| Xylene | 50 cc | 43 | 94.48 | | 19.1 |

EXAMPLE X

| | | | | | |
|---|---|---|---|---|---|
| Pyrogenic silica | 50 cc | 2.25 | 4.9 | | 1 |
| Pyruvic acid | 2 drops | .15 | .33 | 6.7 | |
| Cyanoethylcyclohexylamine | do | .11 | .24 | 4.9 | |
| Xylene | 50 cc | 43 | 94.53 | | 19.1 |

EXAMPLE XI

| | | | | | |
|---|---|---|---|---|---|
| Pyrogenic silica | 50 cc | 2.25 | 4.84 | | 1 |
| Formic acid | 2 drops | .14 | .31 | | |
| Hydroxyethylcyclohexylamine | do | .12 | .26 | | |
| Xylene | 50 cc | 43 | 94.59 | | 19.1 |

EXAMPLE XII

| | | | | | |
|---|---|---|---|---|---|
| Pyrogenic silica | 50 cc | 2.25 | 4.84 | | 1 |
| Formic acid | 2 drops | .14 | .31 | 6.2 | |
| Phenylcyclohexylamine | do | .12 | .26 | 5.3 | |
| Xylene | 50 cc | 43 | 94.59 | | 19.1 |

EXAMPLE XIII

| | | | | | |
|---|---|---|---|---|---|
| Pyrogenic silica | 50 cc | 2.25 | 4.83 | | 1 |
| Lactic acid | 3 drops | .22 | .48 | 9.8 | |
| Triethanolamine | 2 drops | .14 | .31 | 6.2 | |
| Xylene | 50 cc | 43 | 94.38 | | 19.1 |

EXAMPLE XIV

| | | | | | |
|---|---|---|---|---|---|
| Pyrogenic silica | 50 cc | 2.25 | 4.86 | | 9 |
| Octanoic acid | 9 drops | .46 | .99 | 20 | |
| Cyanoethylcyclohexylamine | do | .51 | 1.1 | 23 | |
| Xylene | 50 cc | 43 | 93.55 | | 19.1 |

EXAMPLE XV

| | | | | | |
|---|---|---|---|---|---|
| Pyrogenic silica | 50 cc | 2.25 | 4.88 | | 1 |
| Octanoic acid | 3 drops | .15 | .32 | 6.7 | |
| Cyanoethylcyclohexylamine | 15 drops | .85 | 1.84 | 37.7 | |
| Xylene | 50 cc | 43 | 92.96 | | 19.1 |

EXAMPLE XVI

| | | | | | |
|---|---|---|---|---|---|
| Pyrogenic silica | 50 cc | 2.25 | 4.87 | | 1 |
| Octanoic acid | 15 drops | .77 | 1.67 | 34.3 | |
| Cyanoethylcylcohexylamine | 3 drops | .17 | .37 | 7.6 | |
| Xylene | 50 cc | 43 | 93.09 | | 19.1 |

EXAMPLE XVII

| | | | | | |
|---|---|---|---|---|---|
| Corundum | 50 cc | 11.0 | 20.1 | | 1 |
| Formic acid | 3 drops | .22 | .403 | 2.0 | |
| Aniline | 6 drops | .36 | .66 | 3.2 | |
| Xylene | 50 cc | 43 | 78.84 | | 39.1 |

The corundum used in Example XVII above was Alumina Dry Powder, Type B, for metallographic polishing as supplied by Fisher Scientific Company. The average particle size is given as 0.05 micron.

Depending upon the needs for large output torque or low deenergized viscosity it is possible to vary the quantity of liquid vehicle within wide limits. It has been found that with the pyrogenic silica the vehicle can be varied from 10 to 100 times the weight thereof. With other solid material the vehicle can be varied, but not necessarily over the same limits.

Given an optimum formulation for a particular solid material, substitutions of one hydrogen bonding acid for another or one hydrogen bonding base for another requires the provision of an equal number of the corresponding active hydrogen bonding radicals.

Although use of the electric charging technique described above provides consistently good results, it has been found possible to make useful compositions by omitting that step. However, the change in effective viscosity of the resulting composition is not quite as good as when the step is employed. In addition, for reasons not quite understood, omission of the charging step results on occasion in an inoperative composition.

All of the hydrogen bonding acids and hydrogen bonding bases listed above, but for which no specific examples have been given, have been found operative in accordance with the present invention. However, specific examples have been omitted as only cumulative in nature.

The invention has been described with reference to a number of specific examples. It should be understood, however, that various changes may be made therein as will be apparent to those skilled in the art without departing from the true spirit of the invention as defined in the appended claims.

What is claimed is:

1. An electroviscous composition consisting essentially of a quantity of pyrogenic silica having a mean particle diameter of the order of 0.012 micron; based upon the weight of the silica at least 3.0% of a hydrogen bonding acid selected from the group consisting of formic acid, lactic acid, malic acid, octanoic acid, and pyruvic acid, and at least 2.5% of a hydrogen bonding base selected from the group consisting of aniline, cyanoethylcyclohexylamine, ethylenediamine, hydroxyethylcyclohexylamine, phenylcyclohexylamine, and triethanolamine; and a dielectric liquid vehicle in the range of 10 to 100 times the weight of said silica selected from the group consisting of carbon tetrachloride, xylene, silicone oil with a viscosity of 0.49 centipoise, a liquid fluorocarbon having the formula

mineral oil, olive oil, castor oil, cottonseed oil, and linseed oil.

2. An electroviscous composition consisting essentially of a quantity of pyrogenic silica having a mean particle diameter of the order of 0.012 micron; based upon the weight of the silica, at least 6% formic acid having a water content of less than 12% by volume and at least 8% aniline; and a dielectric liquid vehicle in the range of from 10 to 100 times the weight of said silica selected from the group consisting of carbon tetrachloride, xylene, silicone oil with a viscosity of 0.49 centipoise, and a liquid fluorocarbon having the formula

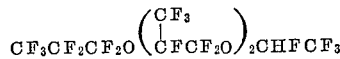

3. An electroviscous composition consisting essentially of silicon dioxide, formic acid, aniline and xylene in approximately the same proportions as 1 gram silicon dioxide, 1 to 3 drops formic acid, 4 to 12 drops aniline, and 24 cc. xylene.

4. An electroviscous composition consisting essentially of silicon dioxide, based upon the weight of the silicon dioxide at least 1% each of formic acid and aniline, and based upon the total weight of the composition at least 65% of a dielectric liquid vehicle selected from the group consisting of carbon tetrachloride, xylene, silicone oil with a viscosity of 0.49 centipoise, a liquid fluorocarbon having the formula

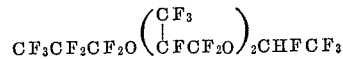

mineral oil, olive oil, castor oil, cottonseed oil, and linseed oil.

5. The method of preparing an electroviscous composition which involves the steps of developing an electric charge on the particles of a quantity of a finely divided non-conductive solid having a mean particle diameter no greater than 0.1 micron, coating the particles with a hydrogen bonding acid and a hydrogen bonding base, and dispersing the coated particles in a dielectric liquid vehicle.

6. The method according to claim 5, wherein the charge is developed by passing a probe charged to a first potential through the quantity of solid particle while the latter is supported by an insulated electrode charged to a potential different from said probe.

7. An electroviscous composition consisting essentially of a quantity of a finely divided non-conductive solid selected from the group consisting of pyrogenic silica, and corundum having a mean particle diameter no greater than 0.1 micron, and based upon the weight of the solid, at least 1% of a hydrogen bonding acid selected from the group consisting of acetic acid, formic acid, lactic acid, malic acid, malonic acid, octanoic acid, oxalic acid, pyruvic acid, and trichloroacetic acid, at least 1% of a hydrogen bonding base selected from the group consisting of methanol, ethyl alcohol, glycerol, ethylene glycol, diethylene glycol, sorbitol, guaiacol, acetamide, formamide, aniline, ethylenediamine, triethanolamine, hydroxyethylcyclohexylamine, cyanoethylcyclohexylamine, phenylcyclohexylamine, benzophenone, phenol, resorcinol, pyridine, and ammonium hydroxide, the total quantity of said solid, acid and base not exceeding 35% of the total weight of the composition, and the remainder being a dielectric liquid vehicle selected from the group consisting of carbon tetrachloride, xylene, silicone oil with a viscosity of 0.49 centipoise, a liquid fluorocarbon having the formula

mineral oil, olive oil, castor oil, cottonseed oil, and linseed oil.

References Cited

UNITED STATES PATENTS

| | | | |
|---|---|---|---|
| 3,367,872 | 2/1968 | Martinek | 252—74 |
| 2,886,151 | 5/1959 | Winslow | 252—75 X |
| 3,080,318 | 3/1963 | Claus | 252—62.1 |
| 3,143,508 | 8/1964 | Kaprelian | 252—62.1 |
| 2,955,956 | 10/1960 | Baugh et al. | 117—100 |
| 2,967,789 | 1/1961 | Hoyt | 117—100 |
| 3,047,507 | 7/1962 | Winslow | 252—75 |

OTHER REFERENCES

Nesterova, Sci. Reports, Moscow State University (1936), No. 6, pp. 99–104.

LEON D. ROSDOL, *Primary Examiner.*

J. D. WELSH, *Assistant Examiner.*

U.S. Cl. X.R.

192—21.5; 252—63.5, 74, 60, 62.1